United States Patent [19]

Kraft

[11] 4,087,590
[45] May 2, 1978

[54] PRESSURE-EQUALIZED ELECTROCHEMICAL BATTERY SYSTEM

[75] Inventor: Dennis W. Kraft, Thousand Oaks, Calif.

[73] Assignee: The United States of America as represented by the Secretary of the Navy, Washington, D.C.

[21] Appl. No.: 793,568

[22] Filed: May 4, 1977

[51] Int. Cl.² .................................................. H01M 14/00
[52] U.S. Cl. .......................................... 429/6; 429/73; 429/119
[58] Field of Search .................... 429/6, 63, 48, 64, 70, 429/71, 73, 81, 119

[56] References Cited

U.S. PATENT DOCUMENTS

| 3,166,446 | 1/1965 | Hutchison | 429/6 |
| 4,012,234 | 3/1977 | Kraft | 429/6 |

Primary Examiner—Charles F. LeFevour
Attorney, Agent, or Firm—Richard S. Sciascia; Paul N. Critchlow

[57] ABSTRACT

A pack of ordinary, commercially-available batteries is provided with a common electrolyte-filled reservoir coupled to each battery by a small tube. The reservoir includes a compliant diaphragm which, when exposed to deep-sea pressure, applies the pressure to the reservoir electrolyte to force it into the battery. Forceful filling of the cells equalizes their internal and external pressures. Electrical discharge currents are reduced to a minimum by making the tubes as small as and as long as possible.

5 Claims, 3 Drawing Figures

PRESSURE-EQUALIZED ELECTROCHEMICAL BATTERY SYSTEM

BACKGROUND OF THE INVENTION

The present invention relates to electrochemical batteries and, in particular, to battery systems adapted for deep-sea operation.

Batteries which are exposed to deep-ocean pressures can, of course, be easily crushed or damaged unless they are specially-designed or unless their pressure-compensating arrangements are provided. For example, a conventional practice has utilized special pressure vessels which, although they may be capable of, withstanding the ambient pressure nevertheless can become quite complex and expensive particularly when their cost is compared with that of ordinary commercially-available types. However, the usual commercial batteries, such as the lead-acid or Nicad battery types, unfortunately are formed with a relatively thin and flexible casing wall which yields readily to external pressures especially when the casing or cell is not completely filled with its electrolyte. As far as is known, the susceptability of these commercial type batteries to damage has prevented their use in deep-ocean operations in which they are exposed to the severe ambient pressures.

It is therefore an object of the present invention to provide a battery system capable of utilizing relatively thin-walled, commercial-type batteries in deep-ocean applications.

Another object is to provide such a pressure-equalizer system for use with the thin-walled commercial cells.

A further object is to provide a pressure equalizing system in which any discharge current between the batteries is reduced to a minimum.

Another object is to provide a pressure-equalized system which is simple, inexpensive and easily adapted for use with commercially-available batteries.

BRIEF DESCRIPTION OF THE DRAWINGS

The invention is illustrated in the accompanying drawings of which.

DETAILED DESCRIPTION OF THE INVENTION

Figure 1:
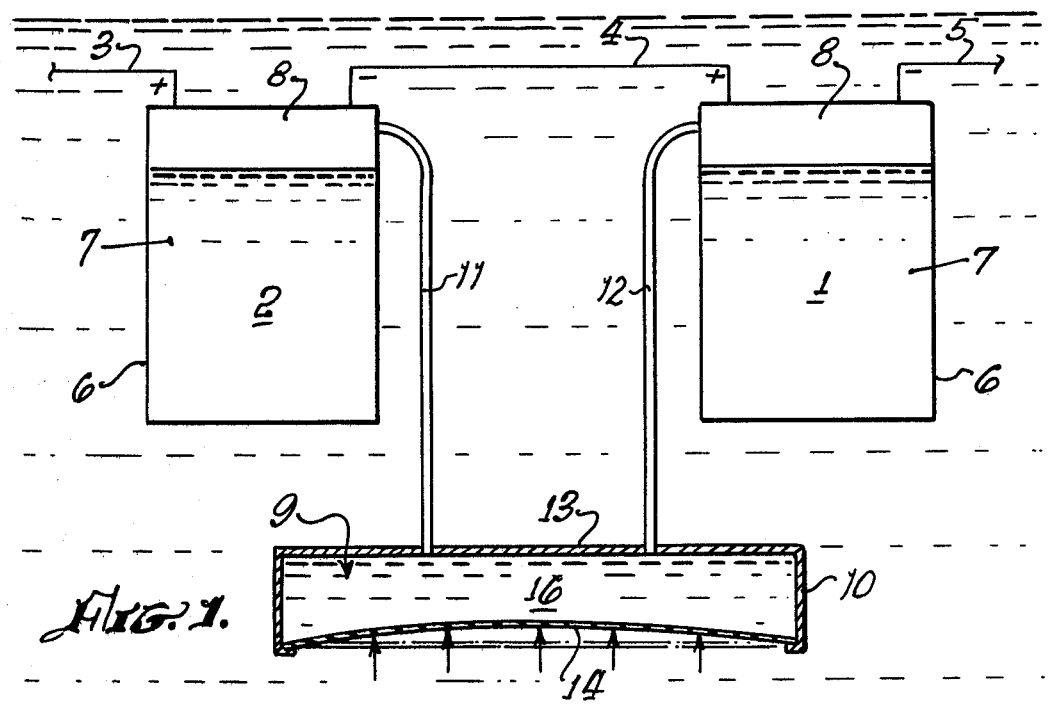
FIG. 1 is a somewhat diagramatic illustration showing a pair of battery cells and the manner in which the internal and external pressures acting on the cells is equalized.

Referring to FIG. 1, the arrangement includes a pair of electrochemical battery cells 1 and 2, which, for descriptive purposes, can be considered as a battery pack having electrical interconnections 3, 4 and 5 coupling the positive and negative terminals of the two batteries one to another and also to other batteries of the pack which are not shown in the drawing. The battery cells are shown schematically since, as will become apparent, many types of commercially-available cells can be modified and used for the purposes of the invention. For descriptive purposes it can be considered that the illustrated cells are commercially-available lead-acid cells having a casing 6 filled with an electrolytic fluid 7. The electrolyte will be that ordinarily used in the particular cells. Thus, if the cell is an acid type (leadacid), it would be sulfuric acid. Alkaline cells, such as the familiar Nicad cells, use KOH or its equivalent. The casing is a relatively thin-walled, flexible member common to most commercial cells. Electrolyte 7 only partially fills each of the cells leaving an empty, unfilled volume 8 at the top. As will be appreciated, this empty volume exists in charged electrochemical battery cells due principally to the gassing which occurs on charging. Insofar as the present invention is concerned such empty portions will be considered as being normally present although their presence is not an operational requisite.

A pressure-equalization arrangement obviously is needed if these cells are to withstand heavy ambient pressures such, for example, as pressures of a deep-ocean environment which are capable of crushing the relatively light side walls of the cells. To provide the pressure-equalization a common reservoir 9 is coupled by small, hollow tubes 11 and 12 coupling the reservoir to each of the cells. If, as is assumed in FIG. 1, the battery pack includes cells other than the illustrated pair, each of the other cells also will be connected to common reservoir 9 by a similar tube. The reservoir is a closed vessel formed with rigid side and upper wall portions 10 and 13 and, in particular, with a bottom wall formed of a complaint diaphragm 14. The small tubes, in turn, communicate the interior of the reservoir with each of the cells and, preferably, enter the cells at their upper portion to communicate directly with their empty or unfilled portions. The manner in which the tubes are coupled to the cells will depend somewhat upon the type of cell used although this coupling should present no particular difficulty. In fact, many of the commercially-available cells already are provided with fill openings into which the tubes can be inserted and sealed. Of particular importance, reservoir 9 is filled with a fluid electrolyte 16 which, in use, also fills the tubes. The type of electrolyte used in the reservoir normally will be the same as that used by the cells themselves or, in other words, if the cell electrolyte is a dilute sulfuric acid, the fluid in the reservoir will be the same. However, as long as the electrolyte fluid of the reservoir is capable of being used in the cells, the conditions of the present invention are satisfied.

Operationally considered, when such a battery pack is deployed at a deep-ocean depth to power, for example, a sonobuoy or other oceanographic devices, the ambient water pressure compresses compliant diaphragm 14 to apply the ambient water pressure through tubes 11 and 12 for the purpose of completely filling cell casing 6. Pressure is equalized since the filling of the cells produces the same internal pressure as that to which the diaphragm is subjected. It will be noted that the capacity of reservoir 9 should be at least as great as the sum of the empty volumes 8 of the cells themselves. For this reason, depending upon the number of cells that are desired for any particular application and also dependent upon the volume represented by unfilled portions 8 of the cell, it may be desirable to provide a common reservoir 9 for a certain plurality of cells. In other words, for practical reasons, it may become desirable to employ a common reservoir for a fixed number of batteries. This factor will become more apparent in the description of the implementation shown in FIG. 3.

Figure 2:
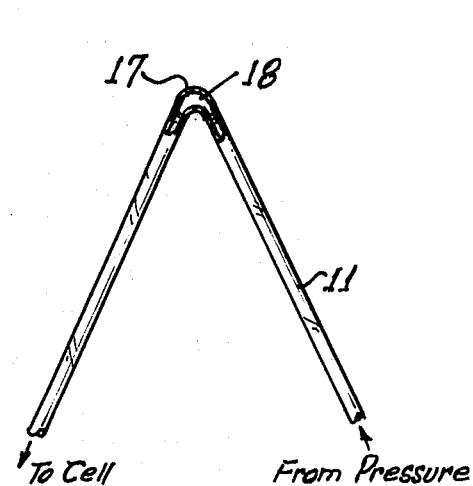
FIG. 2 is a view showing a small section of a tube connection formed to provide a special gas trap.

One other factor to be considered is that because electrolytic fluids are conductive, there will be an electrically-conductive path formed from one of the cells through its tube 11 and on through reservoir 9 and tube 12 to the other cell. Since the cells are electrically interconnected, this path is capable of permitting an undesirable electric discharge current to flow between the cells. To avoid this discharge current, tubes 11 and 12 should be formed with an internal diameter that is as small as possible and also they should have a length which is as large as possible. The purpose in these criteria is to impose in the conductor path a resistance that is sufficient to counteract the discharge current. In a particular implementation, the tubes have an ID of about 0.25 inches and a length of about 6 to 7 inches. Such dimensions provide a resistance of approximately 10 Kohms per tube which is a sufficient resistance to reduce the discharge current to a point permitting submerged operation for relatively long periods of time. If the operational life of the system is to extend for excessive periods, it may be desirable to utilize the special gas bubble arrangement illustrated in FIG. 2. In this arrangement, each of the tubes, such as tube 11, is formed with a reverse bend or crimp 17 in which, during operation, a bubble of gas 18 becomes firmly lodged. The gas bubble is derived from the cell operation and its function is to break or disrupt the discharge current path which may be flowing within tube 11.

Figure 3:
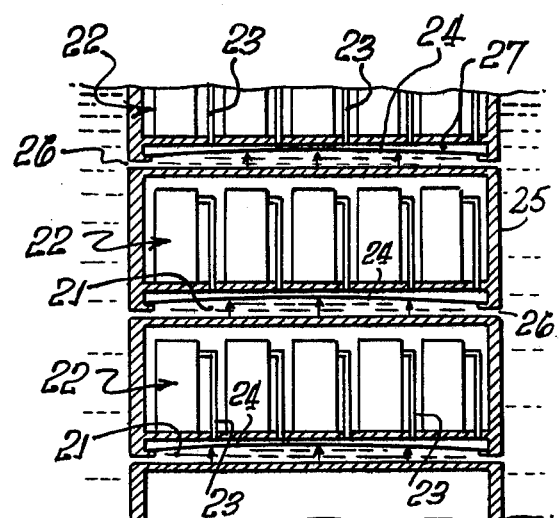
FIG. 3 shows an arrangement in which the pressure equalizing system is applied to a large number of batteries.

FIG. 3 illustrates a special arrangement in which a large number of batteries are needed to supply the power for a particular underwater operation. This or other comparable arrangements are used when the number of batteries is so large that it becomes impractical to provide a common reservoir for the entire number. Instead, the batteries are arranged in separate packs each having its own reservoir 21. More specifically, a plurality of battery packs 22 are disposed in a stacked arrangement and held in this arrangement by a casing 25. Instead of using a special casing, it will be appreciated that other arrangements are equally suitable. For example, each of the battery packs can be interconnected and then potted as a unit and, in this case, the packs themselves simply would be held together by several vertical rods. In a manner similar to that shown in FIG. 1, each of the reservoirs 21 is communicated with the cells by small tubes 23 that, again, are as small as and as long as possible to minimize discharge current. Further, each of the reservoirs is provided with a compliant diaphragm 24 similar in all respects to the diaphragm shown in FIG. 1. To expose the diaphragm to ambient pressures, casing 19 is formed with openings 26 through which sea-water obviously can enter. Sea-water pressure compresses compliant diaphragm 24 to force an electrolyte 27 carried by the reservoir into the battery cells to equalize the ambient pressure. It should be noted at this point that the use of a compliant diaphragm also is a matter of choice. Other compliant arrangements which yield to ambient pressure can be used. For example, a plunger type mechanism can be substituted. The plunger would yield to pressure to compress the electrolyte in the reservoir. If desired, the reservoir can be formed of a completely compliant casing. In the particular implementation shown in FIG. 3, each of battery packs 22 included twenty cells with six of these packs stacked to provide the desired battery power.

The operation of the system should be quite apparent from the foregoing description. Its advantages include its relative simplicity and economy in that the battery cells used can be ordinary, commercially-available cells. These cells are simpler and less expensive than the special pressure vessels or other specially-designed, sea-water types of batteries. Commercial cells purchased on the open market require only very a simple modification to adapt them for present use. Even so, a unit such as that shown in FIG. 3, has been found suitable for operation at pressures up to 10,000 psi.

Obviously many modifications and variations of the present invention are possible in the light of the above teachings. It is therefore to be understood that within the scope of the appended claims the invention may be practiced otherwise than as specifically described.

I claim:

1. A pressure equalized electrochemical battery system for use in a pressurized seawater environment comprising:

a battery pack formed of a plurality of electrically-interconnected electrochemical batteries each having a battery case containing a conductive fluid electrolyte, a reservoir means formed as a closed vessel containing a fluid electrolyte for said batteries, and tube-like means having a constantly-open passageway communicably coupling the electrolyte of said reservior means with the electrolyte of each of said batteries, said battery cases being formed of a thin-walled semi-rigid casing material and said reservoir vessel including a material having greater compliancy than said battery casing material for compliantly responding to sea-water pressures for constantly forcing said reservoir electrolyte into said battery cases to fill the cases and equalize their internal and external pressures.

2. The system of claim 1 wherein said tube-like members each are in the form of an individual non-conductive flexible tube coupled between each battery and said reservoir, said tubes being of sufficient length and having a sufficiently small internal diameter for effectively minimizing electrical discharge current flowing in the electrolytic path provided from one battery to another through said tubes and reservoir.

3. The system of claim 2 wherein said reservoir means is an enclosure formed in part by a compliant diaphragm.

4. The system of claim 1 wherein each of said batteries cases normally in an unpressurized environment is only partially-filled with said electrolyte for providing an empty volume within said cases, and said reservoir vessel and tubes when pressurized are filled with said reservoir electrolyte fluid, the fluid capacity of said vessel and tubes being at least equal to the empty volume of said cells.

5. The system of claim 4 wherein said system is capable of equalizing environmental pressures up to 10,000 psi.

* * * * *